Oct. 3, 1967  H. A. ENDRES ET AL  3,345,323
RUBBER COMPOSITION AND METHOD OF PREPARATION
Filed Feb. 21, 1963
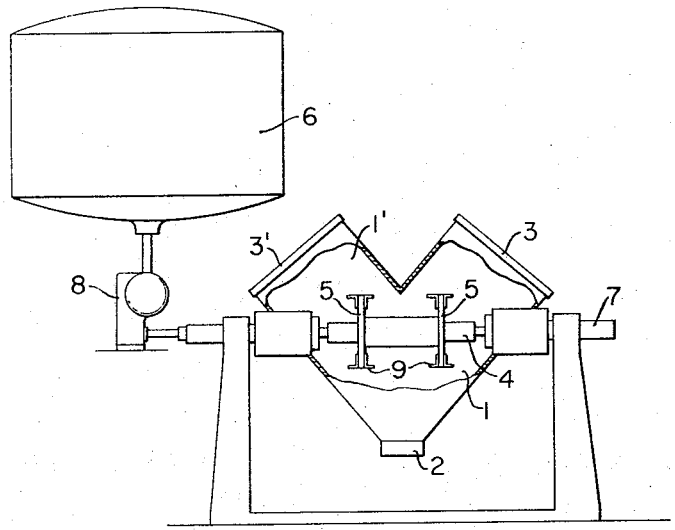
FIG. 1
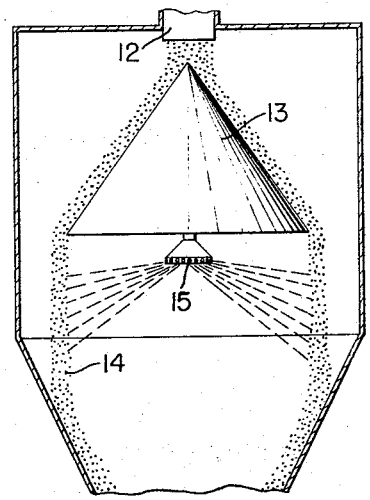
FIG. 3
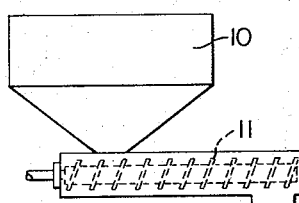
FIG. 2
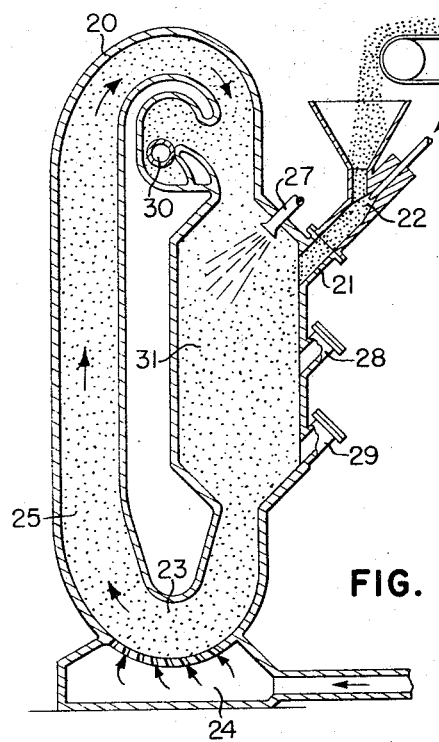
FIG. 4
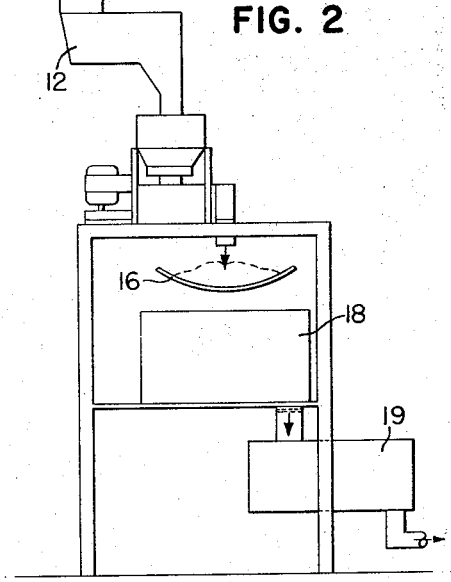
INVENTOR.
HERBERT A. ENDRES
KENNETH E. BRISTOL
ATTORNEY

United States Patent Office 3,345,323
Patented Oct. 3, 1967

3,345,323
RUBBER COMPOSITION AND METHOD
OF PREPARATION
Herbert A. Endres, Cuyahoga Falls, and Kenneth E. Bristol, Akron, Ohio, assignors to The Goodyear Tire & Rubber Company, Akron, Ohio, a corporation of Ohio
Filed Feb. 21, 1963, Ser. No. 260,176
4 Claims. (Cl. 260—41.5)

This invention relates to unvulcanized rubber compositions which are free flowing powders and to their preparations. More specifically, this invention relates to a method for mixing a latex with a powdery material having relatively high water absorbency to obtain a wet composition which may be dried to obtain the dry unvulcanized free-flowing rubber powder.

Unvulcanized free-flowing finely divided rubber compositions are used commercially to form rubberized bitumens useful for paving roads and other products. Also, these compositions are useful as injection molding powders. These unvulcanized free-flowing rubber powders have been made on a commercial scale by intimately mixing latex and an aqueous slurry of a carrier such as clay, powdered coal or powdered high melting bitumen, then co-precipitating the intimate mixture to obtain a fine particle size coagulum slurry. The co-precipitation is achieved by treating the mixture with coagulating chemicals and the resulting coagulum is removed by filtration to obtain a wet mass, containing at least 50% water and no more than about 40% rubber. This wet mass is then flash dried to obtain the unvulcanized free-flowing rubber powder.

A principal object of this invention is to provide a method of making a dry free-flowing unvulcanized rubber composition which does not use coagulation chemicals and does not require filtration to obtain the wet mass. The method of producing the thin free-flowing finely divided unvulcanized rubber composition of this invention has the following advantages over the coagulation method for their production, namely, (1) no chemicals are needed for formation of aqueous dispersion and their coagulation, (2) no filtration is required, (3) the amount of water to be evaporated is less, and (4) the rubber content of the rubber powder may be considerably higher.

These and other objects and advantages of the present invention will become apparent from the following detailed description when taken in conjunction with the appended drawings, wherein:

FIG. 1 is a side view in elevation of a V-type blender adapted to add the latex as a spray through the axle of rotation; FIG. 2 is an elevational view of a cone conditioner positioned to feed a hammermill which in turn feeds the crushed product to a drier. FIG. 3 is a cut-away view in elevation of the cone conditioner. FIG. 4 is a diagrammatic view of an elongated circular apparatus for adding a partitioning powder to a latex spray while the latex is being sprayed into a stream of hot air, and completing the drying as the mixture continues through the apparatus to obtain a finely divided unvulcanized rubber composition.

The equipment used for mixing the latex and powdery material in the batch run shown in Examples 1 to 4 can best be seen in FIG. 1.

This equipment comprises two cylinders 1, 1' joined as two legs of a V with a closure 2 at the bottom and closures 3, 3' at the top end of each leg. This assembly of two cylinders rotates slowly on the axis 4 of the cross piece of the V. The cross piece is a hollow shaft 7 which can be rotated rapidly and furthermore this shaft has slotted discs 5 through which liquids within the shaft can be thrown out into the chamber formed by the cylinders by the rapid rotation of the shaft. The latex from a supply tank 6 is fed into the hollow shaft 7 at its open end by means of gravity or a pump 8. The discs have arms 9 on them which violently agitate the contents of the cylinders as the twin cylinder chamber rotates about the axis of the shaft. The latex is thrown out as a spray into the tumbling and violently agitated powder within the twin cylinders. After the addition of the latex, tumbling was continued for 2–3 minutes, then the semi-damp powder was transferred to a vacuum tumble drier and dried at 210° F. for 30–60 minutes.

The following batches are representative of those which were prepared:

TABLE I

| Example No. | Ratio Rubber/Powder | Powder | | Wt. of Latex #5352,[1] lbs. | Addition Time, min. | Post Tumbling, min. | Vacuum Drying | |
|---|---|---|---|---|---|---|---|---|
| | | Type | Weight, lbs. | | | | Time, min. | Final Percent Moisture |
| 1 | 70/30 | Micro-Cel E | 1.5 | 5 | 3.5 | 3 | 30 | 0.9 |
| 2 | 80/20 | do | 1.5 | 8.6 | 9 | 3 | 60 | 0.5 |
| 3 | 60/40 | Celite #292 | 2.0 | 4.3 | 3.5 | 2 | 43 | 0.1 |
| 4 | 70/30 | do | 2.0 | 6.67 | 6 | 2 | 60 | 0.6 |

[1] Latex 5352 is a 75/25% copolymer of butadiene and styrene at 66–70% total solids content.

In those asphalts which are good dispersers for styrene-butadiene rubber the new rubber powders made in Examples 1 to 4 show little or no rubber phase structure in freshly spread microscope specimens. Such mixtures have satisfactorily low viscosities and show little or no tendency to settle or cream during hot storage of either the cutback or the asphalt.

In asphalts which are not good dispersers of styrene-butadiene rubber the new rubber powders from Examples 1 to 4 show a distinct rubber phase structure in fresh specimens, viscosities of rubberized cutbacks and asphalts are high and separation occurs during hot storage. This separation, however, involves creaming rather than settling: Thus, redispersion of the powder of this invention is easily accomplished. It should be appreciated that creaming never forms as cohesive a mass while settling does form a cohesive mass.

*Example V*

The blocking tendency of the dry rubber powders from Examples 1 to 4 were measured by placing a weight equivalent to 1 pound per square inch on the level surface of the material in a quart can. The rate and depth of sinking of the weight into the powder (extent of compression) was measured on the sample held in an oven at 150° F. In an attempt to simulate jolting during storage or transporting, the oven was jarred at about 10-minute intervals during the first five hours of the test. The compression figures obtained are shown in Table II:

TABLE II

| Product Designation | Percent Compression after Elapsed Time in Hours | | | | | | |
|---|---|---|---|---|---|---|---|
| | 0.02 | 0.16 | 0.5 | 2.5 | 5 | 24 | 96 |
| Control A [1] | 18.8 | 18.8 | 20.7 | 22.7 | 24 | 29.0 | 29.0 |
| Example 3 | 4.4 | 5.8 | 5.8 | 5.8 | 5.8 | 5.8 | 7.2 |
| Example 1 | 4.4 | 4.4 | 4.4 | 5.8 | 5.8 | 5.8 | 7.2 |
| Example 2 | 10.1 | 10.1 | 10.1 | 10.1 | 10.1 | 11.6 | 13.0 |

[1] The control was a coprecipitation powdered product containing 60% mica and 40% unvulcanized butadiene-styrene rubber.

After 96 hours, the samples designated as Example 3 and Example 1 emptied from the cans easily and did not block together. The sample designated as Example 2 was slightly blocked and the control sample was strongly blocked. These blocking tests demonstrate that even the 80% rubber/20% filler powder is superior to a conventional coprecipitated rubber powder in resisting the tendency to block during storage and shipment.

*Example VI*

The extent of reinforcement of asphalt properties by rubber is dependent on the amount, type and degree of swelling and dispersion of the rubber in the asphalt. Consequently, little or no difference in reinforcement was obtained between 60/40 Rubber/Celite #292 of Example 3, 70/30 Rubber/Micro-Cel E of Example 1 and 80/20 Rubber/Micro-Cel E of Example 2. All gave the expected changes in penetration and softening point, better than normal improvement in toughness. The properties of these blends are shown in the following table in comparison with asphalt and Control A.

TABLE III

| Rubber Powder Added | | Penetration | | SP, °F. | Toughness (In.-Lbs.) | 5 cm./minute Ductility | |
|---|---|---|---|---|---|---|---|
| Amount | Type | 32° F. | 77° F. | | | 39.2° F. | 77° F. |
| Ruber Powder in Berry Asphalt [1] | | | | | | | |
| 0 | None | ---- | 85.2 | 113 | 32 | 7.5 | 150+ |
| 2.4 | Control A | 18 | 71 | 124 | 58 | 150+ | 130 |
| 1.5 | Example 1 | 25.5 | 76 | 119.5 | 57 | 150+ | 80 |
| 2.4 | Example 1 | 26.2 | 71 | 125.5 | 69 | 99 | 100 |
| 2.4 | Example 2 | 27.2 | 72.3 | 124 | 92 | 150+ | 135 |
| Rubber Powder in Conoco Asphalt [2] | | | | | | | |
| 0 | None | 20.7 | 97.5 | 111 | 27 | 6.5 | 145 |
| 2.5 | Control A | 20.7 | 85 | 120 | 82 | 44 | 150+ |
| 1.5 | Example 1 | 19.8 | 71.3 | 117.5 | 110 | 21 | 150+ |
| 2.4 | Example 3 | 18.5 | 70 | 118.5 | 180 | 27 | 150+ |

[1] This asphalt had an ASTM penetration at 77° F. of from 85 to 100 but exhibited poor dispersing properties for a styrene-butadiene rubber.
[2] This asphalt also had an ASTM penetration at 77° F. of from 85 to 100 but it exhibited good dispersing properties for a styrene-butadiene bubber.

When Examples 1, 2, 3 and 4 were repeated with another batch of Latex #5352 which had a low gel content, the ductility of the asphalt blends made with these low gel unvulcanized rubber powders showed a considerable improvement in ductility at 39.2° F.

*Example VII*

Where continuous runs are desired it is preferred to use the equipment shown in FIGS. 2 and 3. Referring specifically to FIG. 2, numeral 10 is a storage bin from which the powdery material is fed by screw 11 to the distributor head 12. The powdery material then drops from the distributor head onto the cone 13, best seen in FIG. 3, and moves downward around the cone to fall as a cylindrical curtain 14 of powdery material. The latex is sprayed from the spray head 15 onto the cylindrical curtain of falling powder to form a wet mealy non-adhering mass which drops onto a rotating table. The rotating table discharges the wet mass onto a moving belt 16 which moves the wet mass to a hammermill 18 or other suitable mixing equipment such as a twin screw paddle mixer. The hammermill further mixes the latex and powdery material and thereby eliminates the production of large lumps upon drying the wet mass. The mesh of the screen through which the material from the mill passes is utilized to determine the ultimate particle size distribution of the dry rubbery composition obtained. The wet pulverized material from the screens is fed to a Raymond Flash Drier 19 or other suitable drying equipment.

Best results are obtained where the powdery material is fed to the cone at a constant flow and at a uniform rate. By maintaining a curtain of powder between about ⅛ and ⅜ inch in thickness, penetration and conditioning of all the particles in the powder falling from the cone is achieved. To further illustrate this invention utilizing the equipment of FIGS. 2 and 3, 8 drums of a butadiene-styrene latex of about 69.1% solids were blended with about 900 pounds of Micro-Cel E and the physical characteristics and feed rates for samples taken during this run are indicated in the table below:

TABLE IV

| Sample No. | Feed Rate (lbs./hr.) | | Product after Drying | | | |
|---|---|---|---|---|---|---|
| | Micro-Cel E | Latex 69% Solids | Lbs. Collected Product 80% Rubber | Screen Analysis | | |
| | | | | Percent on 20 Mesh | Percent on 40 Mesh | Percent Through 40 Mesh |
| 1 | 245 | 1,067 | 1,065 | 0.3 | 7.1 | 92.6 |
| 2 | 308 | 1,353 | 638 | 1.8 | 20.2 | 78.0 |
| 3 | 279 | 1,225 | 212 | 0.3 | 14.2 | 85.5 |
| 4 | 247.5 | 1,082 | 282 | 1.8 | 21.6 | 76.6 |

The wet product from the mill was fed to a Raymond flash drier from which it emerged containing between 0.5 and 1% moisture and at a temperature less than about 212° F. The physical properties of the dried product obtained from sample 2 were as follows: 1.8% was retained on a 20-mesh screen; 20.2% retained on a 40-mesh screen and 78.0% passed through the 40-mesh screen. This sample contained 22.5% by weight of ash and 0.8% water. The percent ash on samples taken during the 8 drum run varied from a high of about 23% to a low of about 11%. It should be appreciated that higher and lower percentages of ash could be obtained by varying the Micro-Cel E to latex feed ratio. Also by use of suitable screens on the mill a dry product was made having as little as 70% of the particles that would pass a 40-mesh screen to as high as about 98%.

A rubberized asphalt was made by adding 3.0 parts of the dry product of sample 2 to 100 parts of a typical 120/150 ASTM penetration asphalt. The physical properties of this asphalt and the resulting rubberized asphalt is shown below:

TABLE V

|  | Penetration | | Softening Point (° F.) | Cohesive Energy [1] (In.-Lbs.) | 5 cm./minute Ductility | |
|---|---|---|---|---|---|---|
|  | 32° F. | 77° F. |  |  | 39.2° F. | 77° F. |
| No rubber | 48 | 128 | 106.5 | 14.5 | 43 | 134 |
| 3.0 parts sample 2 | 44 | 97.5 | 123 | 55 | 150+ | 150+ |

[1] Determined according to the Goodyear Instrom Toughness test found in the May 1958 Journal of the Highway Division, proceedings of the American Society of Civil Engineers, paper 1651—19.

Example VIII

Reference to FIG. 4 shows an elongated tubular apparatus 20 having a feed leg 21 for the powdered material and a venturi nozzle 22 located therein. The powdery material falls down the powder leg 21 and is blown into the tubular apparatus by a stream of hot air which scatters it in drying chamber or down leg 31. As the powdery material falls into the bottom 23 of the apparatus it is contacted with a stream of hot gas from the manifold 24. These hot gasses act as a suspending medium for the powdery material and convey it upward in the upper leg 25 of the apparatus. The latex preferably is added by spray head 27 where it simultaneously contacts the powdery material. Also, it should be appreciated that the powder can be fed in at a point farther from the latex feed, such as points 28 or 29, if so desired. This would be especially desirable where the powdery material had a low water absorbency and it was desirable to partially dry the latex spray droplets prior to their contacting the powder.

As the powder coated latex droplets are carried upward in leg 25 by the hot gases, the remainder of the latex water in the coated particles is volatilized.

At the top of the apparatus the gas suspended powdery material containing rubber droplets passes from the tubular apparatus by conduit 30 and as the velocity of the gas decreases the suspended powder separates therefrom and is collected by suitable dust collectors such as bags. This product when removed from the dust collector is the dry free-flowing powdery material of this invention.

Any larger than normal droplets of coated rubber in which an appreciable amount of water remains will not pass out conduit 30 but will flow downward in leg 31 due to the centrifugal effect to thereby be recycled past the hot gasses to complete their drying.

The following examples listed in Table VI shows the effect of various operating conditions on the product produced with the equipment of FIG. 4:

TABLE VI

| Run No. | Feed Rate (lbs./hr.) | | Manifold Pressure at Zone 24, p.s.i.g. | Manifold Temp. at Zone 24, 500° F. |
|---|---|---|---|---|
|  | Micro-Cel E | Latex |  |  |
| 1 | 440 | 1,885 | 10 | 500 |
| 2 | 284 | 1,220 | 5 | 500 |
| 3 [1] | 245 | 975 | 10–30 | 640 |
| 4 | 291 | 1,246 | 10 | 500 |
| 5 | 291 | 1,246 | 20 | 500 |
| 6 | 376 | 1,620 | 5 | 600 |

[1] All the latex used in these runs contained about 69% solids except Latex 975 which contained 22% solids.

| Run No. | Moisture Content of Product, Percent | Screen Analysis of the Product, Percent | | |
|---|---|---|---|---|
|  |  | On 24 Mesh | On 40 Mesh | Through 40 Mesh |
| 1 | 2.2–5.4 |  | 19–68 | 81–32 |
| 2 | 1.2 | 1.3 | 28 | 70.7 |
| 3 | 0.3 |  | 0.5 | 99.5 |
| 4 | 2.3–4.8 | 6–10 | 12–18 | 82–72 |
| 5 | 1.8 | 6 | 16 | 78 |
| 6 | 11.2 | 46 | 20 | 34 |

It should be obvious to those skilled in the art that one of the operating conditions in the use of the equipment in FIG. 4 is that the gaseous temperature or powdered temperature should be in excess of the boiling point of water and no greater than the scorch point of rubber. Usually the operating temperatures preferred will be about 300 to 600 although temperatures as high as 700° F. may be used in portions of the equipment where some water is still being evaporated from the latex. Also, it should be appreciated that the dry powder in bulk contains about one volume of gas space per volume of powder as these powders have a water absorption of at least one gram per gram. Also, it should be appreciated that as the dry powder is agitated or mixed with gas the volume of gas space per volume of powder may be considered as increasing.

By this invention it is possible to obtain free-flowing unvulcanized rubber powders which have an unusual high percentage of rubber relative to the inert filler and these high rubber content free-flowing powdery compositions having at least 60% and preferably 70 to 80% or higher rubber content are especially attractive from a freight standpoint.

While it has been found that many types of unvulcanized latex rubber may be used to produce dry powders, it is desirable that the latices have a rubber content of more than about 35% to obtain the rubber powders of this invention. The "high rubber content latices" are preferred and in this specification this designation means those latices which contain at least about 50% and preferably 60 to 70% or more rubber. For optimum results latices containing 55 to 70% or more of rubber solids are used. Latices of 50 to 70% concentrations may be made by the judicious selection of polymerization recipes or by concentration of dilute latices. The latices useful in this invention are also sometimes designated as polymers of the alpha olefin and/or diolefins. Some representative latices are natural rubber latices and polyisoprene latices, polyisobutylene latices, polychloroprene latices, butadiene-styrene latices, i.e., SBR latices, polybutadiene latices, polyacrylonitrile latices, butadiene-acrylonitrile latices, isoprene-acrylonitrile latices or ethyl acrylate-acrylonitrile latices and polysulfide latices. For coal tar applications it is preferred to use butadiene-acrylonitrile latices, especially those wherein the ratio of butadiene and acrylonitrile ranges from about 50 to 85% of butadiene by weight to 15 to 50% of acrylonitrile by weight. These nitrile rubbers are preferred where maximum resistance to solvent attack is desired.

The powdery materials, sometimes called carriers or partitioning agents in the co-precipitation rubber powder art, useful in this invention are essentially insoluble in rubber and water, inert and neither highly basic nor acidic, but have a water absorbency of at least one gram per gram. Absorbency is determined by titration of a 1 to 6 gram sample of the powder in a 200 milliliter round bottom flask. The size of the sample varies with the density of the powder. With the high density powders 6 grams of the powder is used for the titration but where the density is low then only 1 gram of powder should be used. The actual weight of the powder used is determined and then water is added from a buret in small increments usually about a half to one-tenth of a milliliter at a time. After the addition of each increment of water the flask is rotated so that the portion of the powder which has been wetted, forms a ball which rolls around on top of the unwet powder, and then further increments of water are added to the ball and the flask again is rotated to pick up more dry powder onto the ball. The end point of titration is the point at which the ball has picked up all of the free powder in the flask. Usually a drop or two more of the liquid will make the ball sufficiently wet to smear the inside of the flask. From the amount of water added and the weight of the sample the water absorption of the powder is calculated as grams of water added per gram of powder.

As indicated previously it is essential that the powders used in this invention be able to absorb at least one gram of water per gram of powder. Therefore, the preferred powders are those which have a water absorbency of at least two and usually about 3 to 4 or more grams per gram as these powders permit relatively high rubber containing compositions to be obtained when using latices containing less than about 60% rubber.

In addition to the water absorption of the powders it is also desirable and essential that the powder have a particle size as determined by U.S. standard screen tests as follows:

| | Percent by weight |
|---|---|
| Passing a 100 mesh | 100 |
| Passing a 200 mesh | 99 | and that the rubber containing free-flowing, dry powder have a size less than about 40 mesh.

The water absorbency of some commercial powders of the diatamaceous earth and clay types useful in this invention are given in Table VII:

TABLE VII

| Powder | Absorbency, Grams Water Per Gram | Density, Loose Weight, Lbs./Cu. Ft. |
|---|---|---|
| Micro-Cel A | 4.25 | 7.5 |
| Micro-Cel B | 2.40 | 14.5 |
| Micro-Cel C | 4.25 | 7.5 |
| Micro-Cel E | 4.70 | 4.5 |
| Celite #292 | 2.0 | |
| Bentonite | 1.20 | |
| Fuller's Earth | 1.1 | |

The Micro-Cel's are Johns-Manville's trade name for the products produced by the hydro-thermal reaction of diatamaceous earth with a source of calcium such as calcium oxide. These Micro-Cel's contain very little or only fragments of the honeycombed structure found in diatamaceous earths such as the Johns-Manville product Celite #292. Also the Micro-Cel's have an average particle size smaller than the particle size of a diatamaceous earth such as Celite #292.

While certain representative embodiments and details have been shown for the purpose of illustrating the invention, it will be apparent to those skilled in this art that various changes and modifications may be made therein without departing from the spirit or scope of the invention.

I claim:

1. A method for producing a powdery unvulcanized rubber composition which consists essentially of the steps of
   (1) controllably adding a latex having a rubbery content of at least about 35% by weight to an inorganic powdery material having a water absorbency of at least one gram per gram;
   (2) mixing the powdery material in contact with the latex with more powdery material to maintain the free-flowing powdery nature throughout the mixture;
   (3) continuing this controlled addition and mixing until the amount of latex absorbed on all the powdery material is sufficient to yield a loose, mealy powder containing at least 60% by weight of rubber but insufficient to yield a pasty adhering mass, and
   (4) then removing the absorbed water to obtain the mixture as a dry powder containing at least 60% by weight of rubber.

2. The process of claim 1 wherein the powdery material has a water absorbency of at least 2.0 grams per gram.

3. A method for producing a powdery unvulcanized rubber composition which comprises
   (1) controllably adding a latex to an inorganic powdery material having a water absorbency of at least one gram per gram;
   (2) agitating the powdery material having latex deposited thereon to bring the powdery material into contact with more material containing less absorbed water than that amount equivalent to the water absorbency of said powdery material;
   (3) continuing this control addition of latex and agitation until the amount of latex absorbed on all the material is sufficient to yield a dry powder containing at least 35% by weight of unvulcanized rubber; and
   (4) then removing the absorbed water from the wet mass to obtain a dry product.

4. A method for producing a finely divided unvulcanized rubber composition which consists essentially of the steps of
   (1) adding latex to an inorganic powdery material having a water absorbency of at least one gram per gram and having at least one volume of gas space per volume of powder;
   (2) agitating the powdery material to increase the ratio of gas volume to powder volume while the latex content of the powdery material is increasing to an amount sufficient to yield a dry mixture containing at least 40% by weight of unvulcanized rubber; and
   (3) then removing the water from a wet mass to obtain a dry powder.

References Cited

UNITED STATES PATENTS

| | | | |
|---|---|---|---|
| 1,521,657 | 1/1925 | Teague | 260—765 |
| 2,700,655 | 1/1955 | Endres et al. | 260—765 |
| 2,809,179 | 10/1957 | Endres et al. | 260—765 |
| 3,194,781 | 7/1965 | Hedberg et al. | 260—33.6 |
| 3,226,312 | 12/1965 | Lamm et al. | 204—154 |

JULIUS FROME, *Primary Examiner.*

MORRIS LIEBMAN, *Examiner.*

A. H. KOECKERT, R. S. BARON, *Assistant Examiners.*